UNITED STATES PATENT OFFICE.

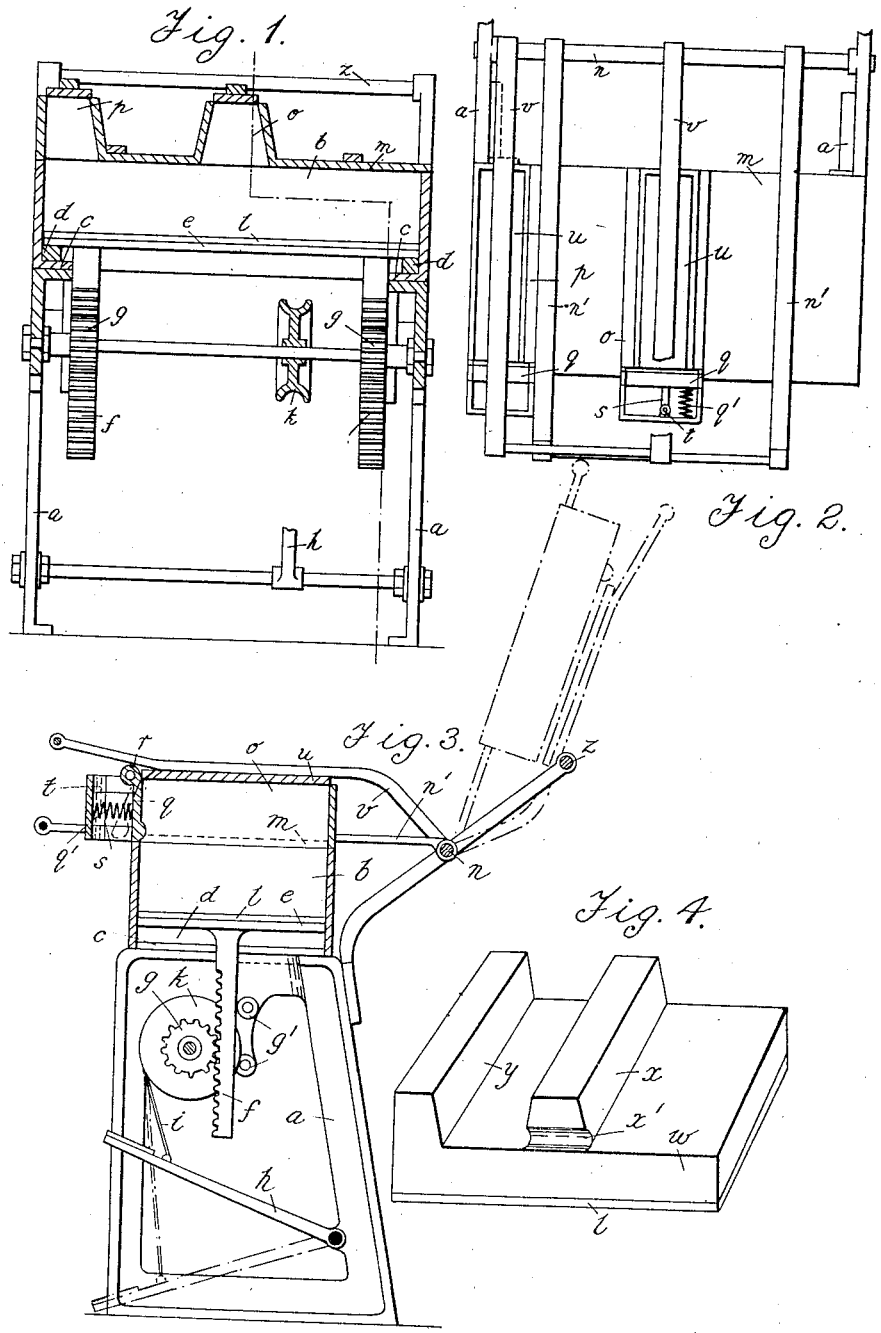

GEORGE ALEXANDER TONKIN, OF LONDON, ENGLAND, ASSIGNOR OF ONE-HALF TO PERCY EVANS, OF LONDON, ENGLAND.

MACHINE FOR MOLDING CONCRETE OR LIKE BLOCKS.

1,347,356.   Specification of Letters Patent.   Patented July 20, 1920.

Application filed December 15, 1919. Serial No. 344,997.

*To all whom it may concern:*

Be it known that I, GEORGE ALEXANDER TONKIN, a subject of the King of Great Britain, residing at London, England, have invented a new and useful Improvement in Machines for Molding Concrete or like Blocks, of which the following is a specification.

This invention relates to an improved machine for molding concrete or like blocks or bricks useful for building purposes. The improved machine is more particularly intended for molding blocks which are provided with ribs or are T-shaped in cross section but can be used to mold blocks of other shapes requiring the use of a two part mold.

The machine comprises a frame supporting a mold in which a tray is provided suitable for carrying a pallet, and movably supported by racks in engagement with pinions on a shaft rotated by means of a treadle to raise or lower the tray through the mold. The pallet, which may be plain or patterned, is separate and removable from the mold.

The machine frame also carries a combined rammer and upper mold part which can be brought down on to the lower or fixed mold to ram the material in the latter and then left in position thereon. Said combined rammer and upper mold part are conveniently carried by arms pivoted to the machine frame and in this construction the side of the upper mold part remote from the pivotal supports is open and a movable door is provided to close this side before the upper mold part is filled. In addition there is provided a rammer for ramming the material in the upper mold part and this rammer may be mounted on the machine frame in a similar manner to the upper mold part.

The interior walls of the molds may themselves form the molding surfaces or separate plain or patterned molding boards may be lodged in the molds.

The accompanying drawing shows how the said invention may be conveniently and advantageously carried into practice. In this drawing:—

Figure 1 shows a sectional elevation;

Fig. 2 a plan, and

Fig. 3 a sectional end elevation of the improved molding machine.

Fig. 4 is a perspective view of a block molded in the machine.

As shown in the drawing, $a$, $a$ are end frames supporting a mold $b$ having interior projecting lips $c$ provided to support loose distance pieces $d$. A tray $e$ is movably arranged within the mold $b$ and can be raised and lowered therein by means of racks $f$ and pinions $g$ operated by a pedal $h$ through a cord or chain $i$ and pulley $k$. The racks $f$ may be guided and held against the pinions $g$ by rollers $g'$ or by any other convenient guiding device. The tray $e$ when lowered rests on the distance pieces $d$ as shown in Figs. 1 and 3 and forms a support for a removable pallet $l$. The distance pieces $d$ are chosen so as to support the tray $e$ and pallet $l$ in a position to provide a casting space of the required depth.

A rammer $m$ is pivotally supported on a bar $n$ by arms $n'$ and has in combination therewith one or more molds $o$, $p$, each of which has one of its sides $q$ pivoted or hinged to the mold at $r$. A locking plate $s$ hinged to the mold at $t$ is provided to lock the side $q$ of the mold in the position in which it is shown in full lines in Fig. 3 to close the mold, but this locking plate can be swung aside to allow the side $q$ to move to the open position indicated in broken lines in Fig. 3, and if desired a spring $q'$ may be employed to move the side $q$ to this open position. A rammer $u$ pivotally supported on the bar $n$ by arms $v$ is provided for ramming the material in the upper molds $o$, $p$.

The improved molding machine is intended for use in molding blocks of the shape shown in Fig. 4 comprising a slab portion $w$ with one or more ribs or projections $x$, $y$. By omitting the mold $p$ and extending the face of the rammer $m$ in place thereof a block can be molded which is substantially T-shaped in cross section comprising only the slab $w$ and rib $x$. The side $q$ may be flat or shaped as shown in Fig. 3 to form a groove or channel $x'$ in the rib $x$.

In the use of the machine, the tray $e$ is brought to its lowermost position resting on the distance pieces $d$ in the lower or fixed mold $b$ and the pallet $l$ is placed thereon. The requisite quantity of concrete or other material to be molded is filled into the lower mold and rammed to consolidate it by lowering the combined upper mold parts and rammer *m* thereon. The upper mold parts *o*, *p*, are then left at rest on the lower mold and the open sides *q* are closed after which these upper molds are filled and the material therein rammed by means of the rammer *u*.

To remove the molded article the sides *q* are released by swinging aside the locking plates *s* and then the upper molds *o*, *p*, and rammer *m* are lifted off while the rammer *u* is held down on the molded material to prevent breakage of the corners of the ribs *x*, *y*. The open sides of the upper molds allow the latter to move away from the molded article freely in turning about their pivotal support at *n*. When the combined mold and rammer has moved a short distance so that the molds *o*, *p*, are freed from the material molded therein the rammer *u* and rammer *m* are moved together to the position indicated in broken lines in Fig. 3 and rested against a bar *z*. The molded article is then raised on the pallet *l* out of the lower mold *b* on the tray *e* by acting on the treadle above referred to. The pallet can then be carried away from the machine with the molded article resting thereon and left to set or dry on this pallet. Each machine is provided with the requisite number of pallets to permit it to continue in use while the molded articles are being set or dried.

I claim:

1. In a machine for molding concrete blocks, the combination of a fixed lower mold part and a relatively movable combined rammer and upper mold part.

2. In a machine for molding concrete blocks, the combination of a fixed lower mold part, a relatively movable combined rammer and upper mold part, and a separately movable rammer.

3. In a machine for molding concrete blocks, the combination of a lower mold part, a combined rammer and upper mold part, and pivotally mounted arms by which said combined rammer and upper mold part is carried.

4. In a machine for molding concrete blocks, the combination of a lower mold part, a combined rammer and upper mold part, pivotally mounted arms by which said combined rammer and upper mold part is carried, a rammer, and pivotally mounted arms by which said rammer is carried separately.

5. In a machine for molding concrete blocks, the combination of a fixed lower mold part, and a relatively movable combined rammer and upper mold part having one side thereof hinged thereto.

6. In a machine for molding concrete blocks, the combination of a lower mold part, a relatively movable combined rammer and upper mold part having one side thereof hinged thereto, and a hinged plate for locking the said hinged side in its closed position.

7. In a machine for molding concrete blocks, the combination of a lower mold part, a relatively movable combined rammer and upper mold part having one side thereof hinged thereto, and a spring for moving the said hinged side to its open position.

8. In a machine for molding concrete blocks, the combination of a lower mold part, a tray, means for moving the said tray through the said lower mold part, and a combined rammer and upper mold part mounted so as to be movable relatively to the said lower mold part.

GEORGE ALEXANDER TONKIN.

Witnesses:
JOHN T. KNOWLES,
HERBERT A. BEESTON.